Patented Dec. 2, 1947

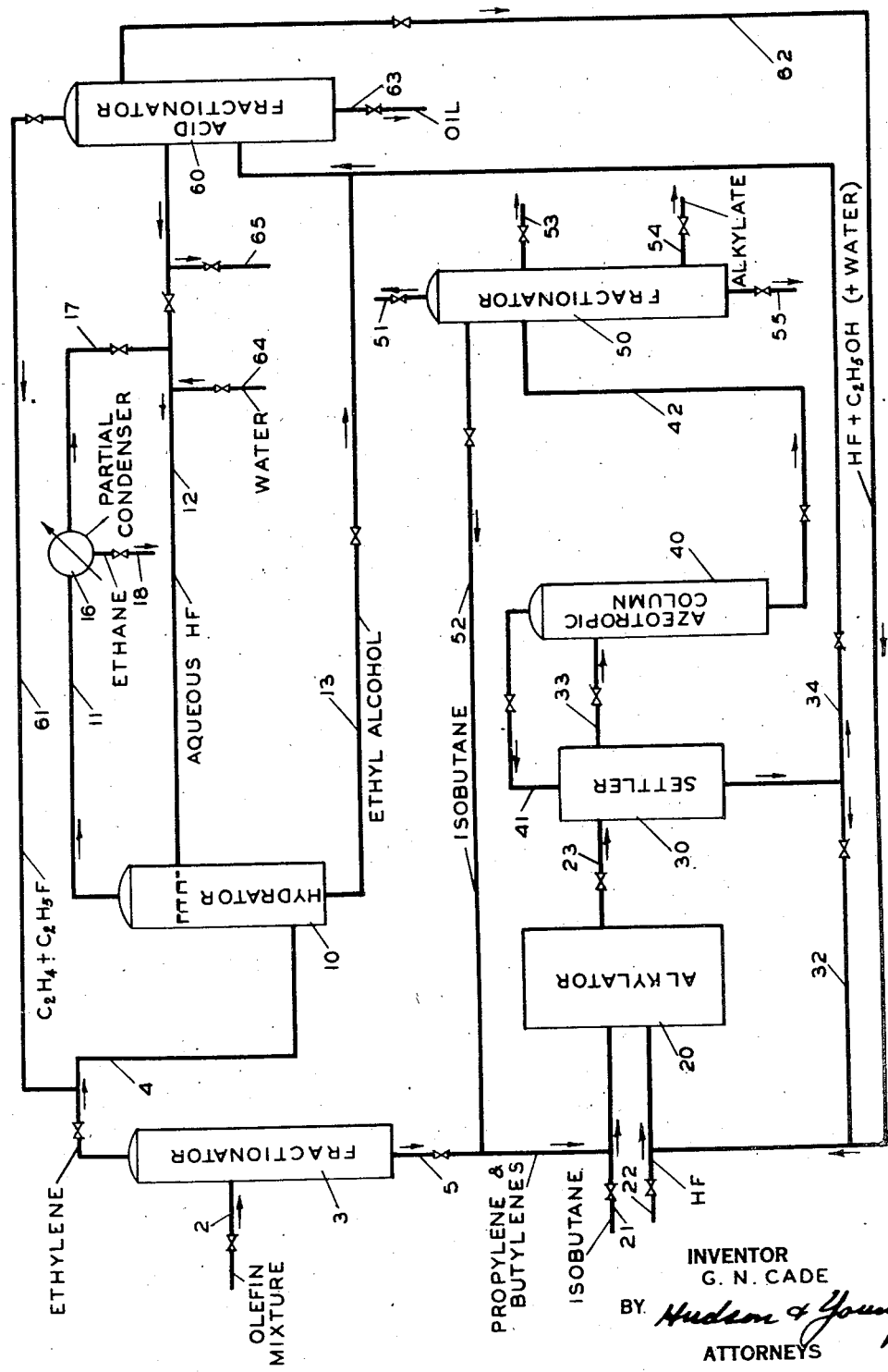

2,431,685

UNITED STATES PATENT OFFICE 2,431,685

PROCESS FOR ALKYLATION OF AN ORGANIC COMPOUND WITH AN OLEFIN IN PRESENCE OF HYDROFLUORIC ACID

George N. Cade, Bartlesville, Okla., assignor to Phillips Petroleum Company, a corporation of Delaware Application August 28, 1944, Serial No. 551,592

5 Claims. (Cl. 260—683.4)

This invention relates to the conversion of organic compounds in the presence of a hydrofluoric acid catalyst. In a particular modification it relates to the alkylation of organic compounds by reaction with olefins in the presence of a hydrofluoric acid catalyst and use of used alkylation catalyst to convert olefins to alcohols which can be used in the alkylation step to modify the characteristics of the alkylation catalyst.

Numerous workers have shown that various organic compounds can be reacted with olefin hydrocarbons and with other alkylating reactants to produce alkyl derivatives using concentrated hydrofluoric acid as the alkylation catalyst. Among organic compounds which can be so alkylated are hydrocarbons, including isoparaffins, normal paraffins, cycloparaffins, aromatic hydrocarbons, and known hydrocarbon organic compounds which include the reactive groups of the above-mentioned hydrocarbons, particularly phenols, and other substituted aromatic compounds. The alkylation reaction is comparatively rapid at temperatures within the atmospheric temperature range and may be conducted in relatively simple alkylation equipment. It has been found that improved results are obtained when the alkylation is conducted with a liquid hydrofluoric acid which is either substantially anhydrous or at most contains only a few per cent of water and which contains a small amount of a low-boiling alcohol. This is particularly true when low-boiling isoparaffins are reacted with olefins to produce normally liquid paraffin hydrocarbons boiling in the motor fuel range. The amount of alcohol which is preferably used in such a procedure is between about 0.1 and 10 per cent by weight of the hydrofluoric acid and preferably about 5 per cent by weight. However, one of the disadvantages of such an operation is that unduly large amounts of water tend to accumulate in the hydrofluoric acid catalyst, either from association with the alcohol which is introduced as a tempering agent, or as a result of side reactions which take place when an alcohol is present during the alkylation reaction. I have now found that this water which tends to be present can be concentrated in connection with the purification of the used alkylation catalyst to produce an aqueous hydrofluoric acid which is suitable for the conversion of low-boiling olefin hydrocarbons to alcohols suitable for use as tempering agents in the alkylation step. I have also found that used alkylation catalyst and effluents of a conversion step, such as just discussed, for the production of alcohols can be treated together to effect in an efficient manner purification of the alkylation catalyst and concentration of the alcohol which is to be used in the alkylation step as a tempering agent.

An object of this invention is to effect a conversion of organic compounds in the presence of a hydrofluoric acid catalyst.

Another object of my invention is to effect an improvement in the alkylation of organic compounds when they are reacted with olefins in the presence of a hydrofluoric acid alkylation catalyst.

A further object of my invention is to effect an efficient conversion of olefin hydrocarbons to alcohols in the presence of aqueous hydrofluoric acid.

Still another object of my invention is to improve the alkylation of low-boiling isoparaffin hydrocarbons by reaction with olefins contained in a normally gaseous olefinic mixture such as is available around most oil refineries.

Still other objects and advantages of my invention will become apparent from the accompanying disclosure and discussion.

In accordance with one mode of practicing this invention, a mixture comprising normally gaseous unsaturated hydrocarbons is fractionated to separate a minor fraction comprising ethylene and a major fraction comprising butylenes and propylene. The latter fraction is passed to a hydrofluoric acid alkylation step, and the former is passed to a hydration step, in which the ethylene is converted, in the presence of aqueous hydrofluoric acid, to ethyl alcohol, which is added to the concentrated acid used as the alkylation catalyst to obtain a high yield of high quality alkylation products. A principal novel feature of this invention is the method by which the ethyl alcohol is added to the alkylation catalyst without simultaneous addition of an undesirably great amount of water and without the use of separate apparatus for purification of the ethyl alcohol. The ethyl alcohol is normally withdrawn from the hydration step as a mixture with water and hydrofluoric acid; the water content is ordinarily at least as high as the alcohol content. When the hydrogen fluoride content of the mixture is increased to at least 60 weight per cent, all of the alcohol can be distilled as a ternary azeotropic mixture containing approximately 30 weight per cent hydrogen fluoride, 60 weight per cent ethyl alcohol, and 10 weight per cent water, when distilled at atmospheric pressure. According to a preferred modification of this invention, the hydrogen fluoride content of the mixture is raised to 60 weight per cent or higher, preferably by the addition of hydrofluoric acid withdrawn from the alkylation step, and the highly acidic mixture obtained is distilled in the apparatus ordinarily used for regeneration of the hydrofluoric acid used in the alkylation step. The regenerated hydrofluoric acid and the ternary azeotrope are separated as a single fraction and passed to the alkylation step. Since this fraction contains only approximately one part by weight of water to six parts by weight of ethyl alcohol, and since the preferred concentration of alcohol in the alkylation catalyst, as used in the alkylation step, is approximately 5 weight per cent, the amount of water introduced with the alcohol is satisfactorily low. Furthermore, no additional apparatus is used to separate the ethyl alcohol from water.

The accompanying drawing is a schematic flow diagram that illustrates a preferred method of practicing the invention. An olefinic feed containing mainly butanes and butylenes with minor proportions of propane, propylene, ethane and ethylene enters fractionator 3 through inlet 2. From fractionator 3 are withdrawn a lower-boiling fraction comprising principally ethylene and ethane and a higher-boiling fraction comprising chiefly butanes and butylenes with minor proportions of propane and propylene. The lower-boiling fraction is passed through conduit 4 to hydrator 10, in which it is intimately and countercurrently contacted with aqueous hydrofluoric acid, which enters hydrator 10 through conduit 12, under hydrating conditions, which are preferably as follows: temperature, 200 to 500° F.; pressure, 500 to 1000 p. s. i.; titratable acidity of the aqueous hydrofluoric acid, 30 to 60 weight per cent; contact time, 30 to 200 minutes; mol ratio of hydrofluoric acid to ethylene 6:1 to 20:1. Gaseous substantially olefin-free ethane containing vaporized hydrofluoric acid and water is withdrawn through conduit 11 and passed to partial condensation means 16, in which substantially all the vaporized hydrofluoric acid and water are liquefied and from which ethane, substantially free from olefins, hydrofluoric acid and water, is withdrawn through outlet 18. The liquefied water and hydrofluoric acid are recycled through conduits 17 and 12 to hydrator 10. A liquid mixture comprising alcohol, water, and hydrofluoric acid is passed through conduit 13 to acid fractionator 60. A more detailed discussion of the hydration of olefins in the presence of hydrofluoric acid is given in the copending application of Frey, Serial No. 521,833, filed February 10, 1944, The higher-boiling fraction from fractionator 3 is passed through conduit 5 to alkylator 20. Isobutane enters alkylator 20 through conduit 21. In alkylator 20 the total hydrocarbon mixture is intimately contacted with concentrated hydrofluoric acid, which enters through conduit 22. Preferable conditions in alkylator 20 are: temperature, 50 to 150° F.; pressure, 50 to 200 p. s. i.; contact time, 5 to 30 minutes; mol ratio of isobutane to olefin in the feed, 5:1 to 20:1; volume ratio of hydrocarbon to acid, approximately 1:1; titratable acidity of the acid phase, 80 to 95 weight per cent; alcohol content of acid phase, approximately 5 weight per cent. The effluent from alkylator 20 is passed through conduit 23 to settler 30, in which it is separated into a heavier or acid phase and a lighter or hydrocarbon phase. The hydrocarbon phase is passed through conduit 33 to azeotropic column 40, in which is separated an overhead fraction, comprising mainly minimum-boiling azeotropic mixtures of hydrofluoric acid and paraffins, which is passed through conduit 41 to settler 30, and a kettle residue, comprising chiefly acid-free hydrocarbons, which is passed through conduit 42 to fractionator 50. In fractionator 50, which is usually a series of two or more separate columns, are separated a fraction, comprising chiefly propane, which is withdrawn through outlet 51, a fraction, comprising principally isobutane, which is recycled, as through conduit 52, a fraction, comprising principally normal butane, which is withdrawn through outlet 53, a fraction, comprising mainly hydrocarbons boiling in the motor fuel range, which is withdrawn, as the principal product of the process, through outlet 54, and a kettle residue, comprising hydrocarbons boiling above the motor fuel range, which is withdrawn through outlet 55. The fractions that are withdrawn are preferably treated, by means not shown in the drawing, to remove organically combined fluorine, such as is disclosed and claimed in Frey 2,347,945, issued May 2, 1944. The alkylation of hydrocarbons in the presence of a hydrofluoric acid alkylation catalyst tempered by the presence of small amounts of alcohols is fully disclosed in the copending application of Frey, Serial No. 450,588, filed July 11, 1942, now Patent No. 2,384,294 issued September 4, 1945.

The acid phase from settler 30 is recycled in part through conduit 32. The remainder is passed through conduit 34 to acid fractionator 60. The mixture flowing through conduit 34 and that flowing through conduit 13 are so proportioned that the titratable acidity (hydrogen fluoride content) of the mixture entering acid fractionator 60 is at least approximately 60 weight per cent, and may be as high as 80 to 90 per cent. In acid fractionator or purification means 60 are separated a fraction, comprising chiefly ethylene and ethyl fluoride, which is recycled to hydrator 10, as through conduit 61, a fraction, comprising hydrofluoric acid and a ternary azeotropic mixture of water, ethyl alcohol, and hydrofluoric acid, which is recycled to alkylator 20, as through conduit 62, a fraction, comprising a binary azeotropic mixture of water and hydrofluoric acid most of which is passed through conduit 12 to hydrator 10; and a kettle fraction comprising mainly high-boiling acid-soluble organic material, which is withdrawn through outlet 63. The acidity of the binary acid-water azeotrope passed through conduit 12 to hydrator 10 may be adjusted by addition of water, as through inlet 64, but usually part of the binary azeotropic mixture is preferably withdrawn through outlet 65, as necessary, to prevent an undesirably high accumulation of water in the system.

It will be appreciated that the foregoing discussion has been presented for the purpose of illustrating my invention and for showing in general the apparatus in its successful application, and that specific features which have been referred to should not be used to limit the invention unduly. It wil be readily appreciated that the drawing which has been referred to is diagrammatic and that many valves, pumps, fractionators, separators, compressors, coolers and condensers, control equipment, and the like such as are well known to those skilled in the art may be readily designed and supplied for any specific commercial practice of my process.

As an example of the operation of my invention a refinery fraction containing butanes, butylenes, propane, propylene, ethane and ethylene is fractionated to separate a low-boiling fraction containing mainly ethylene and ethane and a high-boiling fraction containing mainy butylenes, butanes, propane and propylene. The ethylene-ethane fraction is countercurrently contacted with 35 weight per cent aqueous hydrofluoric acid in a packed tower at a temperature of 250° F. and a contact time of 60 minutes to effect substantially complete conversion of the ethylene to ethyl alcohol. Gaseous substantially olefin-free ethane containing vaporized hydrofluoric acid and water is withdrawn from the top of the tower and passed to a partial condenser, in which substantially all the vaporized hydrofluoric acid and water are liquefied. Gaseous ethane, substantially free of hydrofluoric acid, water and olefins, is withdrawn from the system and the liquefied hydrofluoric acid and water are recycled to the hydration tower. A liquid mixture of water, hydrofluoric acid, and ethyl alcohol are withdrawn from the bottom of the tower.

The butane-butylene fraction is mixed with additional isobutane to give an alkylation feed containing 10 moles of isobutane per mole of olefin. This feed is continuously contacted with concentrated hydrofluoric acid, in a contactor provided with a motor-driven agitator, at a temperature of 100° F., a contact time of 10 minutes, and a hydrocarbon to acid volume ratio of 1:1. The effluent from the contactor is passed to an acid settler, in which the acid phase is gravitationally separated from the hydrocarbon phase. The hydrocarbon phase is debutanized, and the debutanized alkylate is withdrawn as the product of the process. The acid phase is withdrawn from the settler; a part is recycled to the contactor and the remainder is mixed with the water-hydrofluoric acid-ethyl alcohol mixture effluent from the hydration tower to give an acid regeneration feed having a titratable acidity (hydrogen fluoride content) of 75 weight per cent. The regeneration feed is passed to an acid regeneration system comprising a series of three bubble-plate columns. A relatively small volume of ethylene and ethyl fluoride, produced by the reaction of ethyl alcohol and concentrated hydrofluoric acid, is separated as the overhead fraction from the first column and is recycled to the hydration tower. The kettle residue from the first column is passed to the second column, from which an overhead fraction, comprising mainly concentrated hydrofluoric acid together with a small proportion of a ternary azeotropic mixture of water, hydrogen fluoride, and ethyl alcohol, is withdrawn and recycled to the alkylation contactor. The kettle residue from the second column is passed to a third column, from which an overhead fraction, comprising mainly a binary azeotropic mixture of water and hydrofluoric acid, is recycled to the hydration tower. The kettle fraction from the third column, which comprises chiefly acid-soluble oil is withdrawn from the system.

The fresh acid entering the alkylation step, the acid recycled from the acid settler to the alkylation contactor, and the overhead fraction withdrawn from the second column in the acid regeneration system and passed to the alkylation contactor are so proportioned that the acid entering the contactor has a titratable acidity of 87 weight per cent and an ethyl alcohol content of 5 weight per cent.

It will be readily appreciated that the preceding example is only one specific application of my invention presented for the purposes of illustration. It will also be appreciated that various modifications of my invention can be practiced by one skilled in the art without departing from the spirit or scope of the disclosure or from the scope of the claims.

I claim:
1. An improved process for reacting normally gaseous olefins with low-boiling isoparaffins in the presence of a hydrofluoric acid alkylation catalyst, which comprises separating from a normally gaseous olefinic hydrocarbon mixture an ethylene fraction and an alkylation reactant fraction comprising an olefin having at least three carbon atoms per molecule, passing said ethylene fraction to a hydration step, passing also to said hydration step aqueous hydrofluoric acid from an acid fractional distillation step as hereinafter recited, converting said ethylene to ethyl alcohol in said hydration step in the presence of said aqueous acid as the hydration agent, passing a resulting mixture of ethyl alcohol, water, and hydrofluoric acid to said acid fractional distillation step, reacting said olefinic alkylation reactant fraction in an alkylation step with a low-boiling isoparaffin in the presence of a liquid hydrofluoric acid alkylation catalyst containing a small amount of ethyl alcohol, separating from effluents of said alkylation a liquid hydrofluoric acid and a hydrocarbon material containing paraffins produced by said alkylation, returning a major portion of said hydrofluoric acid to said alkylation, passing a minor portion of said hydrofluoric acid to the aforesaid acid fractional distillation step, removing from said acid fractional distillation step aqueous hydrofluoric acid and passing same to said hydration step, removing also from said acid fractional distillation step a mixture comprising ethyl alcohol and hydrofluoric acid and passing same to the aforesaid alkylation step.

2. An improved process for reacting an olefin with an alkylatable organic compound in the presence of a hydroflouric acid alkylation catalyst, which comprises separating from an olefinic hydrocarbon mixture a low-boiling olefin fraction and a higher-boiling olefin fraction, passing said low-boiling olefin fraction to a hydration step, passing also to said hydration step aqueous hydrofluoric acid from an acid fractional distillation step as hereinafter recited, converting olefins contained in said low-boiling olefin fraction to alcohols in said hydration step in the presence of said aqueous acid as the hydration agent, passing a resulting mixture of alcohol, water and hydrofluoric acid to said acid fractional distillation step, reacting olefins contained in said higher-boiling olefinic fraction in an alkylation step with an alkylatable organic compound in the presence of a liquid hydrofluoric acid alkylation catalyst containing a small amount of an alcohol, separating from effluents of said alkylation a liquid hydrofluoric acid and an organic material containing alkylation products, returning a major portion of said hydrofluoric acid to said alkylation, passing a minor portion of said hydrofluoric acid to the aforesaid acid fractional distillation step, removing from said acid fractional distillation step aqueous hydrofluoric acid and passing same to said hydration step, removing also from said acid fractional distillation step a mixture comprising an alcohol produced in said hydration step and hydrofluoric acid and passing the same to the aforesaid alkylation step.

3. An improved process for reacting a low-boiling olefin hydrocarbon having at least three carbon atoms per molecule with an alkylatable hydrocarbon, which comprises reacting in an alkylation step such an olefin hydrocarbon and an alkylatable hydrocarbon in the presence of a hydrofluoric and alkylation catalyst containing ethyl alcohol in an amount not greater than 10 per cent by weight thereof, separating from effluents of said alkylation an alkylate-containing fraction and used hydrofluoric acid catalyst, returning a major portion of said used catalyst to said alkylation step, passing a minor portion of said used catalyst together with effluents of a hydration step as hereinafter recited to a catalyst purification step, recovering from said purification step purified aqueous hydrofluoric acid, reacting ethylene with said aqueous acid under hydration conditions to produce ethyl alcohol, separating from said hydration a mixture of ethyl alcohol, water and hydrogen fluoride and admixing same with said minor portion of used catalyst to produce a mixture having a hydrogen fluoride content between about 60 and about 90 weight per cent, subjecting said mixture in said purification step to a first distillation to remove a low-boiling ethylene-ethyl fluoride fraction and passing same to said hydration step, subjecting a resulting residue to a second distillation to remove a ternary mixture of water, hydrogen fluoride and ethyl alcohol and passing said mixture to said alkylation step in an amount such that the content of ethyl alcohol in said alkylation step is not more than 10 per cent by weight of the catalyst as aforesaid, subjecting a resulting residue to a third distillation to recover a purified aqueous hydrofluoric acid and passing said aqueous acid to said hydration step as aforesaid.

4. An improved process for reacting an olefin with an alkylatable organic compound in the presence of a hydrofluoric acid alkylation catalyst, which comprises passing a low-boiling olefin to a hydration step, passing also to said hydration step aqueous hydrofluoric acid from an acid fractional distillation step as hereinafter recited, converting said olefin to an alcohol in said hydration step in the presence of said aqueous acid as the hydration agent, passing a resulting mixture of alcohol, water and hydrofluoric acid to said acid fractional distillation step, reacting an olefin in an alkylation step with an alkylatable organic compound in the presence of a liquid hydrofluoric acid alkylation catalyst containing a small amount of an alcohol, separating from effluents of said alkylation a liquid hydrofluoric acid and an organic material containing alkylation products, returning a major portion of said hydrofluoric acid to said alkylation, passing a minor portion of said hydrofluoric acid to the aforesaid acid fractional distillation step, removing from said acid fractional distillation step aqueous hydrofluoric acid and passing same to said hydration step, removing also from said acid fractional distillation step a mixture comprising an alcohol produced in said hydration step and hydrofluoric acid and passing same to the aforesaid alkylation step.

5. An improved process for reacting an olefin with an alkylatable organic compound in the presence of a hydrofluoric acid alkylation catalyst, which comprises passing ethylene to a hydration step, passing also to said hydration step aqueous hydrofluoric acid from an acid distillation step as hereinafter recited, converting ethylene to ethyl alcohol in said hydration step in the presence of said aqueous acid as the hydration agent, passing a resulting mixture of ethyl alcohol, water and hydrofluoric acid to said acid distillation step, reacting butylene in an alkylation step with isobutane in the presence of a hydrofluoric acid alkylation catalyst containing a minor amount of ethyl alcohol, separating from an effluent of said alkylation hydrofluoric acid and an organic material containing alkylation products, returning a major portion of said hydrofluoric acid to said alkylation, passing a minor portion of said hydrofluoric acid to the aforesaid acid distillation step, removing from said acid distillation step aqueous hydrofluoric acid and passing same to said hydration step as aforesaid, removing also from said acid distillation step a mixture comprising ethyl alcohol produced in said hydration step and hydrofluoric acid and passing same to the aforesaid alkylation step.

GEORGE N. CADE.

REFERENCES CITED

The following references are of record in the file of this patent:

UNITED STATES PATENTS

| Number | Name | Date |
|---|---|---|
| 1,438,123 | McElroy | Dec. 5, 1922 |
| 2,342,677 | Linn | Feb. 29, 1944 |
| 2,322,800 | Frey | June 29, 1943 |
| 2,317,901 | Frey | Apr. 27, 1943 |
| 2,286,183 | Bradley | June 16, 1942 |
| 2,320,629 | Matuszak | June 1, 1943 |
| 2,317,694 | Ott | Apr. 27, 1943 |
| 2,014,740 | Larson | Sept. 17, 1935 |
| 2,135,455 | Loder | Nov. 1, 1938 |
| 2,384,294 | Frey | Sept. 4, 1945 |

FOREIGN PATENTS

| Number | Country | Date |
|---|---|---|
| 117,359 | Australia | Aug. 5, 1943 |